2 Sheets- Sheet 1.
C. R. & N. P. OTIS.
Hoisting Apparatus.
No. 9,128. Reissued Mar. 23, 1880.
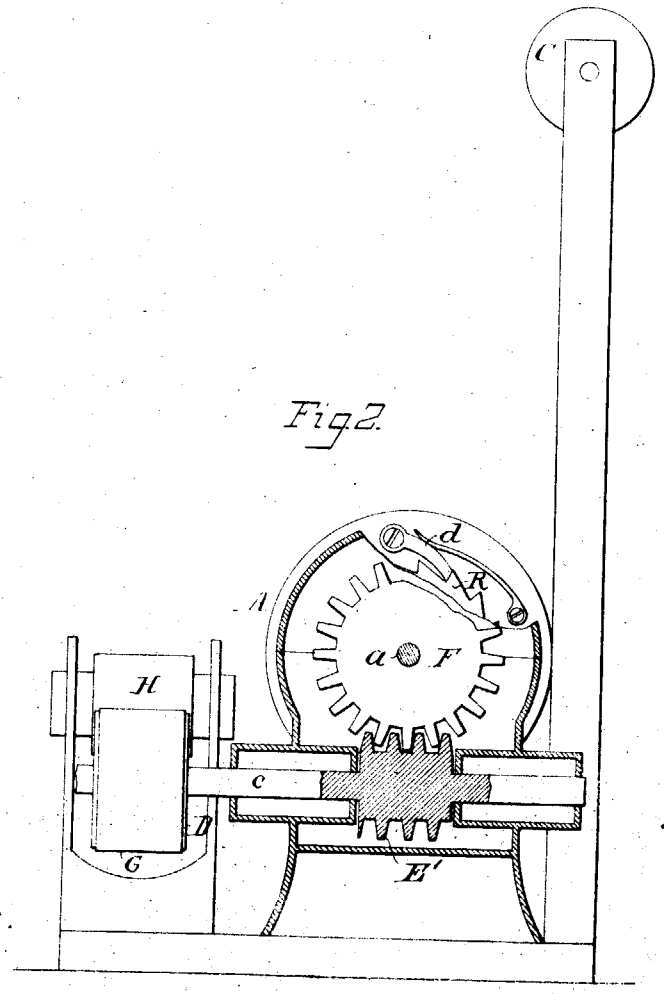
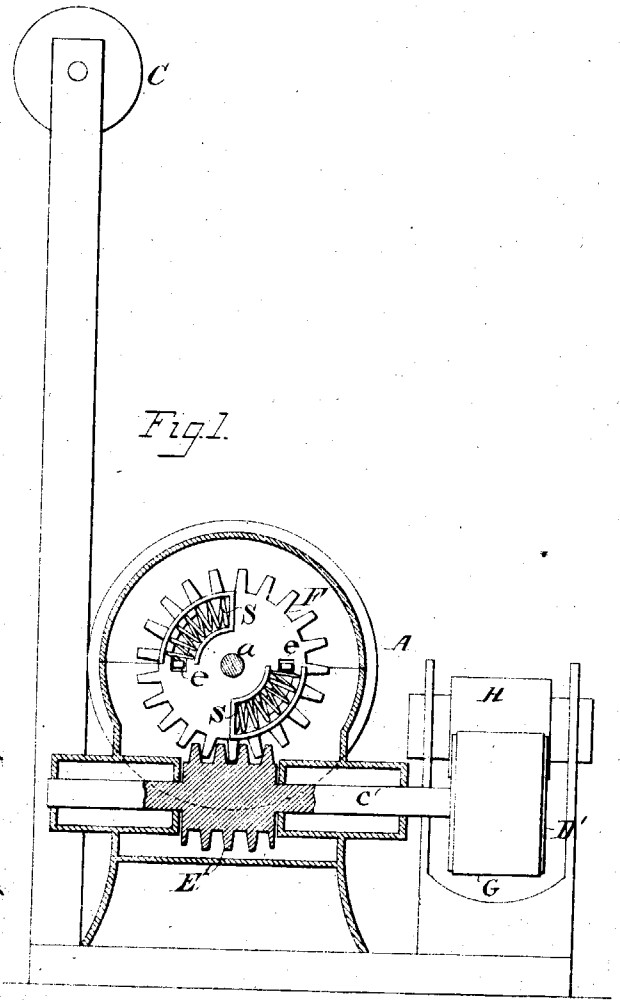
Attest:
Courtney A. Cooper
William Paxton.
Inventor:
Charles R. Otis
N. P. Otis
by Charles E. Foster
their Attorney 2 Sheets—Sheet 2
C. R. & N. P. OTIS.
Hoisting Apparatus.
No. 9,128. Reissued Mar. 23, 1880.
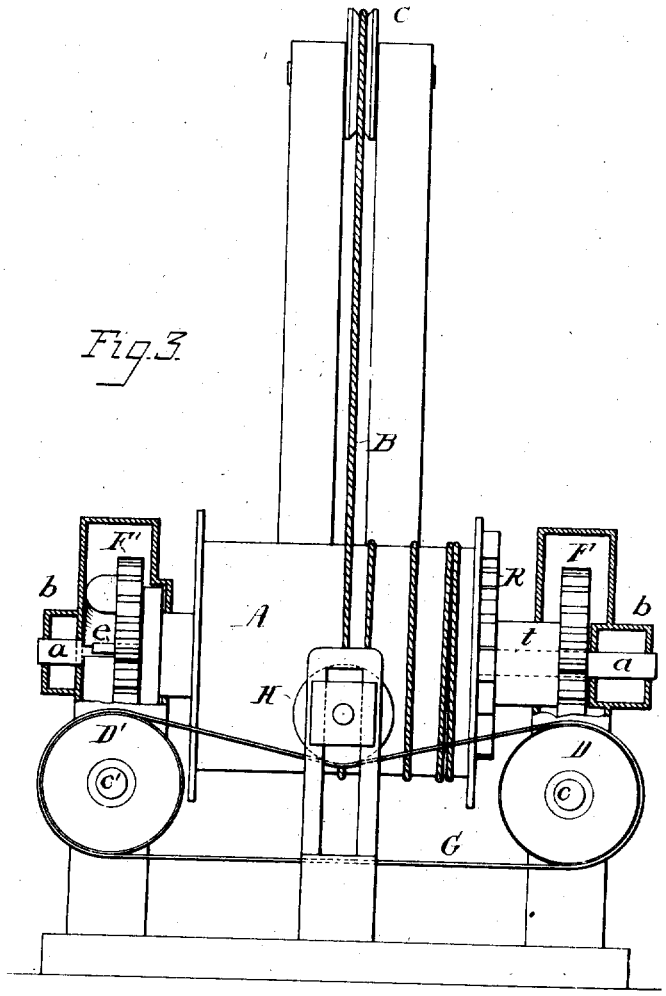
Attest:
Courtney A. Cooper
William Paxton
Inventor:
Charles R. Otis
N. P. Otis
by Charles E. Foster
their attorney

UNITED STATES PATENT OFFICE.

CHARLES R. OTIS AND NORTON P. OTIS, OF YONKERS, NEW YORK.

HOISTING APPARATUS.

SPECIFICATION forming part of Reissued Letters Patent No. 9,128, dated March 23, 1880.

Original No. 83,725, dated November 3, 1868. Application for reissue filed February 9, 1880.

*To all whom it may concern:*

Be it known that we, CHARLES R. OTIS and NORTON P. OTIS, both of the city of Yonkers, Westchester county, and State of New York, have invented certain Improvements in Elevators, of which the following is a specification.

The leading object of our invention is the running of hoisting apparatus at what may be termed "rapid velocity" without the objectionable noise resulting from the employment of spur-gears—an important consideration when the same is designed for hotel use and other like situations. To accomplish this we use worm-gearing, but in such manner as to divide the strain which comes upon the winding-gear between two worms, each of which acts upon a worm-wheel connected with a drum of such larger diameter as will secure the requisite speed of hoisting without driving the worms at a great speed, the division of the strain preventing undue friction and wear on the gear.

To insure uniform action and prevent the strain being thrown unequally on the drivers, we interpose yielding or movable connections between the drivers and the drum, whereby the work is equally divided between the two worms, thus reducing or obviating the strain and wear which result from the almost unavoidable slipping of the belt and from other causes.

Referring to the accompanying drawings, forming part of the specification, Figures 1 and 2 represent sectional opposite side or end elevations of a hoisting apparatus constructed according to our improvement, and Fig. 3 represents a partly-sectional rear elevation or view at right angles to Fig. 1 of the same apparatus.

Similar letters of reference indicate corresponding parts throughout the several figures.

A represents the hoisting-drum, which is here supposed to be fast to its shaft, *a*, that is supported and worked in suitable bearings, *b*. B is the hoisting rope or chain, and C the pulley over which the same is passed to connect with the platform of the apparatus.

To illustrate the different means that may be employed, either separately or concerted, in carrying out our improvements, the drum A is shown as driven at one end through the interposition of springs S, and at its other end through a ratchet-wheel, R, and pawl or pawls, the action of which devices is hereinafter described; but so far as the principle of operation is concerned a spring attachment may be substituted for the ratchet or a ratchet attachment for the spring.

D D′ are driving-pulleys, set in motion by any suitable means and coupled by a belt or strap, G, that may be kept taut by a tightening-pulley, H. The pulleys D D′ carry on their shafts *c c′* worms or screws E E′, arranged to gear with and drive worm-wheels F F′, which, by means of sleeves or otherwise, are loosely hung on the drum-shaft *a*, the drum of which is larger in diameter than the worm-wheels. The ratchet-wheel R is connected with the sleeve *t* of one worm-wheel, F, and gears with the drum by or through a spring-borne pawl or pawls, *d*, while the other worm-wheel, F′, is connected with the drum through the springs S, carried by said wheel and acting on or in connection with studs *e*, projecting from or made fast to the drum.

The above construction obviates the noise incident to the use of spur-gears, and by the combination of the two connected worms driving the same platform with worm-wheels and the drum greater in diameter than the latter a rapid movement of the platform is effected without driving the worms at an excessive speed, while the strain is so divided between the two worms that the latter can be operated at sufficient velocity without undue friction and wear upon any part of the gears.

It is apparent that it is desirable to avoid the throwing of the strain wholly upon one or other of the drivers. When, however, the belts are used, (which is desirable, as a comparatively noiseless action is thereby secured,) the belt is apt to slip from various causes.

By the means we use the effect of this slipping is neutralized and the equal division of the strain upon both gears secured and maintained. For instance, supposing in hoisting the wheel F to run the fastest, then the ratchet-wheel R takes the lead in driving, causing increased compression of the springs S, which resistance is felt or transferred through the wheel F′ to the worm E′, that operates the latter, and thus the strain or wear is divided between the two worms, while if the wheel F runs fastest the springs S take the lead in driving, and are extended, causing the ratchet-wheel R to slip the pawl or pawls *d* till the action of the springs causes a division of the strain.

It may be preferred to dispense with the ratchet attachment and employ springs at both ends, or no springs and ratchets at both ends of the drum.

We claim—

1. The combination, in a hoisting-machine, of two worms, each gearing with a worm-wheel arranged to drive a drum of greater diameter, the whole operating upon the same cage, substantially as set forth.

2. The combination, in a hoisting-machine, of a winding-drum and two worm-gears, the drum being larger in diameter than the worm-wheels, all arranged to operate the rope of the same cage, by means of which a rapid movement without undue strain on the driving-gear is secured, substantially as set forth.

3. The combination, with the winding appliances, of two drivers and interposed equalizing devices, whereby an equal strain is secured and maintained upon both drivers, substantially as set forth.

4. The combination, with the hoisting-drum, of belt-driven gears arranged at opposite ends of the drum, and connected with the latter by interposed equalizing devices, substantially as specified.

In testimony whereof we have signed our names to this specification in the presence of two subscribing witnesses.

CHAS. R. OTIS.
NORTON P. OTIS.

Witnesses:
E. J. HOENEMAN,
JOHN MCMAHON.